(12) United States Patent
Schlesser et al.

(10) Patent No.: US 6,830,110 B2
(45) Date of Patent: Dec. 14, 2004

(54) THREE-POINT HITCH HAVING FLOTATION

(75) Inventors: Walter Mark Schlesser, Ottumwa, IA (US); Timothy James Kraus, Hedrick, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/757,889

(22) Filed: Jan. 14, 2004

(65) Prior Publication Data
US 2004/0188114 A1 Sep. 30, 2004

Related U.S. Application Data

(63) Continuation-in-part of application No. 10/346,881, filed on Jan. 16, 2003, now abandoned.

(51) Int. Cl.⁷ .................. B60K 17/16; A01B 63/112
(52) U.S. Cl. .................. 172/8; 172/439; 180/361
(58) Field of Search .............. 172/2–12, 439; 701/50; 180/348, 359, 360, 361, 900; 280/124.104, 124.111, 124.112, 124.135, 124.143, 124.156

(56) References Cited

U.S. PATENT DOCUMENTS

| | | | |
|---|---|---|---|
| 3,623,304 A | 11/1971 | Molzahn | 56/208 |
| 3,717,995 A | 2/1973 | Case | 60/470 |
| 4,773,666 A | 9/1988 | Koberlein et al. | 280/460 |
| 5,190,111 A * | 3/1993 | Young et al. | 172/7 |
| 5,234,060 A * | 8/1993 | Carter | 172/413 |
| 5,964,077 A | 10/1999 | Guinn | 56/10.2 E |
| 6,003,455 A * | 12/1999 | Flamme et al. | 111/200 |
| 6,068,063 A * | 5/2000 | Mayerle et al. | 172/315 |
| 6,131,062 A * | 10/2000 | Nielsen | 701/50 |
| 6,196,327 B1 * | 3/2001 | Patel et al. | 172/7 |
| 6,491,129 B1 * | 12/2002 | Young et al. | 180/361 |
| 6,612,375 B2 * | 9/2003 | Rogala | 172/8 |

* cited by examiner

*Primary Examiner*—Robert E Pezzuto

(57) ABSTRACT

A three-point hitch suitable for operation with wide implements is constructed by substituting a pair of flotation actuators for the usual drop links that are normally coupled between a pair of rocker arms and a pair of lower draft links. These drop links are coupled to a hydraulic circuit including, according to one embodiment, individual accumulators for each flotation actuator, and according to a second embodiment, both actuators are coupled to a single accumulator. The accumulator(s) act to cause a pre-selected lifting force to be exerted by the flotation actuators so that a predetermined amount of the weight of an implement mounted to the draft links is counterbalanced, leaving a desired ground pressure being exerted by the implement during operation. When using individual accumulators, a side-to-side weight balance can be achieved since different accumulator settings may be used.

7 Claims, 3 Drawing Sheets

THREE-POINT HITCH HAVING FLOTATION

This is a continuation-in-part of U.S. patent application Ser. No. 10/346,881, filed 16 Jan. 2003, now abandoned.

FIELD OF THE INVENTION

The present invention relates to a tractor three-point hitch.

BACKGROUND OF THE INVENTION

A variety of different implements are compatible with common three-point hitching systems. Many implements, such as mower-conditioners, snow plows, etc. need flotation in addition to height control to insure good performance and prevent damage. Presently, flotation is not available in common three-point hitching systems and must be designed into the implement.

SUMMARY OF THE INVENTION

According to the present invention, there is provided an improved tractor three-point hitch.

An object of the invention is to provide a tractor three-point hitch arrangement which provides flotation.

A more specific object of the invention is to provide a three-point hitch arrangement which provides flotation and is achieved by making a relatively simple modification to a common three-point hitch arrangement.

Yet a more specific object of the invention is to provide a three-point hitch arrangement wherein drop links are formed of flotation cylinders which are either coupled to respective accumulators or are both coupled to the same accumulator.

These and other objects of the invention will become apparent from a reading of the ensuing description together with the appended drawings.

DESCRIPTION OF THE PREFERRED EMBODIMENT

Figure 1:
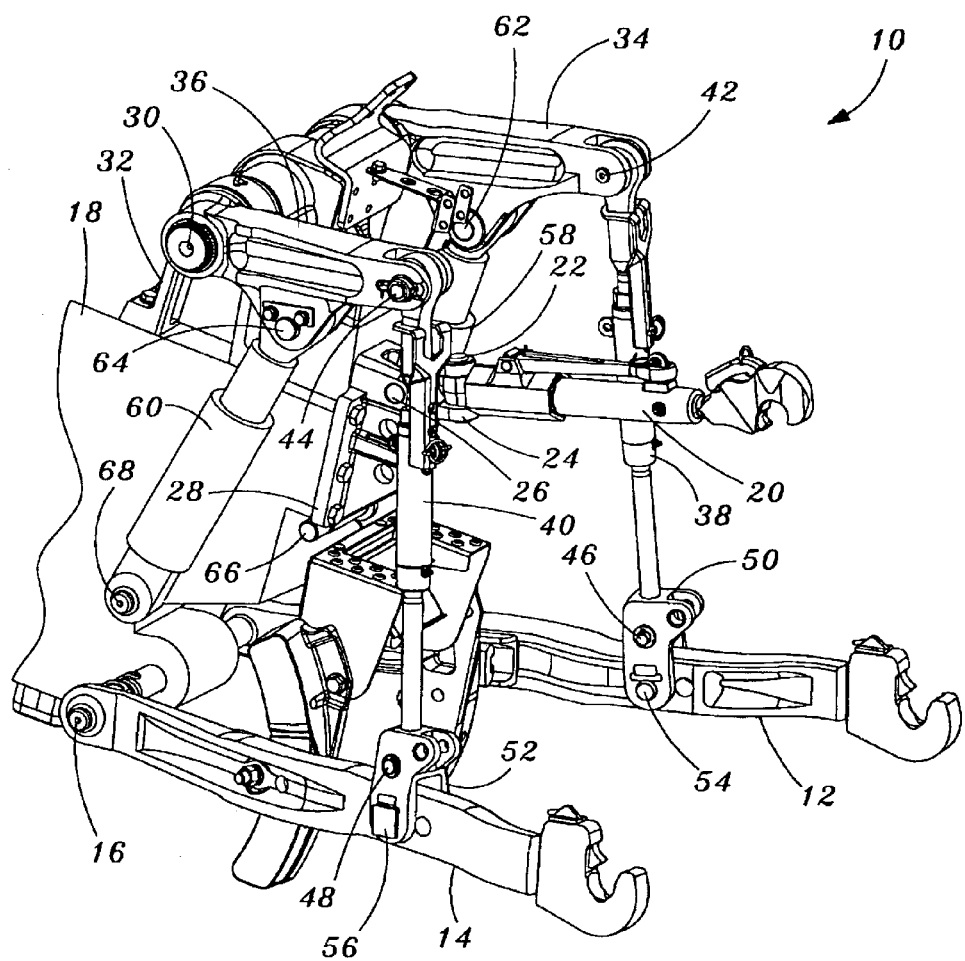
FIG. 1 is a perspective view of a tractor three-point hitch, which is representative of the prior art.

Referring now to FIG. 1, there is shown a tractor three-point hitch assembly which is representative of the prior art. The three-point hitch assembly 10 may be mounted at either the front or the rear of a vehicle and includes, as viewed in the drawing, right- and left-hand lower draft links or arms 12 and 14 mounted for pivoting vertically about a horizontal transverse axis defined by a transverse shaft 16 fixed to a frame 18 of the carrying vehicle. An upper third draft link or arm 20, in the form of a length-adjustable turnbuckle has one end pivotally connected, as by a pin 22, to a bifurcated end of a yoke 24, and has its other end mounted for pivoting vertically about a horizontal transverse pin 26 coupled to a bracket 28 bolted to the vehicle frame 18 at a central location above and between the lower draft links 12 and 14. A horizontal, transverse rock shaft 30 is mounted for rotation within a support member 32 secured to the vehicle frame 18 at a location spaced substantially vertically above the support shaft 16 for the lower draft links. Mounted to the right- and left-hand ends of the rocker shaft 30 are rocker arms 34 and 36, respectively. A pair of lift links 38 and 40, respectively, have upper ends pivotally coupled to free ends of the rocker arms 34 and 36, as by horizontal transverse pins 42 and 44, and have bottom ends pivotally coupled, as by horizontal transverse pins 46 and 48, respectively, to yokes 50 and 52 having bifurcated lower ends coupled in straddling relationship to the draft links 12 and 14 by horizontal transverse pivot pins 54 and 56, respectively. Right- and left-hand lift cylinders 58 and 60, respectively, have upper ends pivotally coupled to the rocker arms 34 and 46, as at pins 62 and 64, and have lower ends pivotally coupled to the vehicle frame 18, as at pins 66 and 68.

Figure 2:
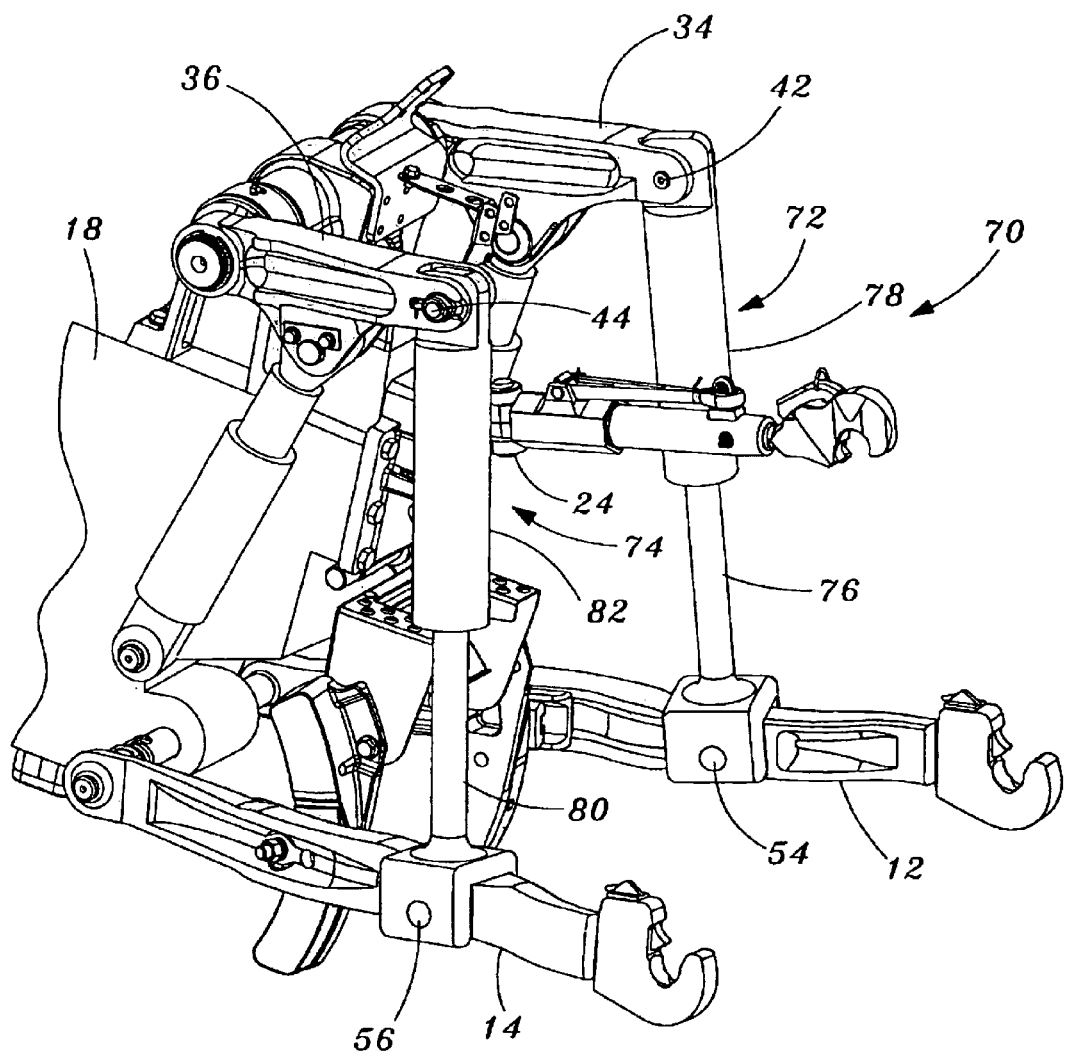
FIG. 2 is a perspective view of the tractor three-point hitch shown in FIG. 1, but modified for forming a three-point hitch constructed in accordance with the principles of the present invention.

Referring now to FIG. 2, there is shown a three-point hitch assembly 70 incorporating the present invention, with components that are the same as those described above relative to FIG. 1, being given the same numeral call-outs. The only difference in the hitch assemblies 10 and 70 is that instead of the lift links 38 and 40 illustrated in FIG. 1, hydraulic float actuators 72 and 74 are provided. The hydraulic float actuator 72 includes a piston rod 76 having clevis at its lower end coupled to the lower draft link 12 by the pin 54 and a cylinder 78 having an upper end located between opposite lugs of a bifurcated free end of the right rocker arm 34 and coupled to the latter by the pin 42. Similarly, the float actuator 74 includes a piston rod 80 having a lower end defined by a clevis coupled to the draft link 14 by the pivot pin 56, and a cylinder 82 having an upper end located between lugs of a bifurcated free end of the rocker arm 36 and coupled thereto by the pin 44.

Figure 3:
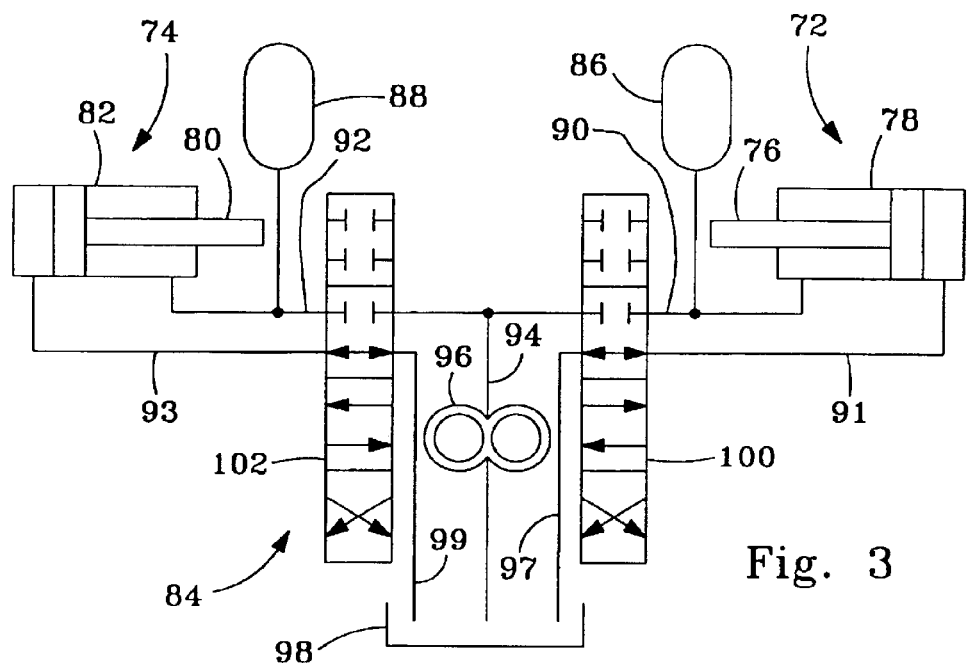
FIG. 3 is a schematic view of a flotation control circuit constructed in accordance with a first embodiment.

Referring now to FIG. 3, there is shown a flotation control circuit 84 constructed in accordance with a first embodiment for controlling the operation of the floatation actuators 72 and 74. The circuit 84 includes a right-hand accumulator 86 coupled to the rod end of the actuator 72 by a supply/return line 90, and includes a left-hand accumulator 88 coupled to the rod end of the actuator 74 by a left-hand supply/return line 92. A further right-hand supply/return line 91 is coupled to the piston end of the actuator 72, and a further left-hand supply/return line 93 is coupled to the piston end of the actuator 74. A pressure fluid supply line 94 is coupled to the output of a pressure-compensated supply pump 96 having its input coupled to a sump or reservoir 98. A right-hand, four-position, four-way directional control valve 100 has a set of supply/return ports respectively coupled to the supply/return lines 90 and 91, and has a supply port and a return port respectively coupled to a first branch of the supply line 94 and to a return line 97, which extends to the sump 98. Similarly, a left-hand, four-position, four-way directional control valve 102 has a set of supply/return ports respectively coupled to the supply/return lines 92 and 93, and has a supply port and a return port respectively coupled to a second branch of the supply line 94 and to a return line 99, which is coupled to the sump 98.

Figure 4:
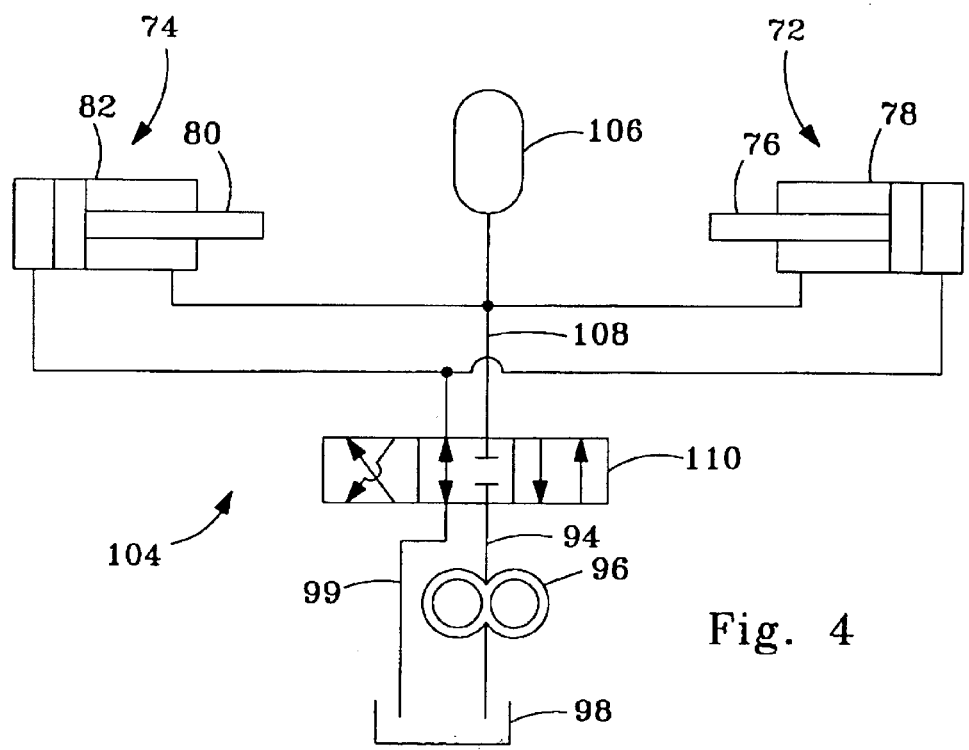
FIG. 4 is a schematic view of a flotation control circuit constructed in accordance with a second embodiment.

A control circuit 104, constructed in accordance with a second embodiment, is illustrated in FIG. 4. The control circuit 104 is a simplification of the circuit 84 in that it includes only one accumulator 106 and only one directional control valve 110, which is a three-position, four-way directional control valve, that, as explained below, has one less function than do each of the valves 100 and 102. Specifically, the accumulator 106 is coupled to a branched supply/return line 108 coupled between a supply/return port of the control valve 110 and the rod end of each of the actuators 72 and 74. A second branched supply/return line 112 is coupled between a second supply/return port of the control valve 110 and the piston ends of the actuators 72 and 74. The pressure fluid supply line 94 is coupled between the outlet of the pump 96 and a supply port of the valve 110, while the return line 99 is coupled between the sump 98 and a return port of the valve 110.

In operation, assume the three-point hitch assembly 70 to be connected to an implement such as a wide area mower or the like, and for the flotation circuit 84 to be in use. When the work site is reached, the servo valve (not shown) for controlling the lift actuators 58 and 60 is actuated to lower the implement and place the actuators in a float mode. The direction control valves 100 and 102, which up to now have been in a lock-out position (indicated at the top of the valves) are shifted to respective working positions (the position illustrated in FIG. 3). Fluid flow to and from the piston ends of the actuators 72 and 74 will then be prevented and a lifting force, as determined by the pressure in the accumulators 86 and 88 will act to counterbalance the weight of the implement. Because the pump 96 is pressure-compensated, its displacement will be zero whenever the direction control valves 100 and 102 block flow to the actuators 72 and 74. A pump which is not pressure-compensated could be used, but in that case, the valves 100 and 102 would have to be replaced with valves having open centers that provide a path back to the sump 98 any time the valves are positioned to block flow to the actuators 72 and 74. Normally, the desired pressure exerted by the accumulators 86 and 88 will be such that only a small portion of the weight of the implement bears on the ground during operation. If the implement is not balanced in weight from side-to-side, then the accumulators 86 and 88 will be set at different pressures so that a balance in side-to side ground pressure results for operation. Then, during operation, undulations in the work surface will result in the supports of the implement, usually skits or the like, to follow the ground contour with fluid being forced from the piston end of the cylinders 78 and 82 to the sump 98 when the rods 76 and 80 are forced upwardly, and with fluid being drawn into the piston ends of the cylinders 78 and 82, when the piston rods 76 and 80 move downwardly. The amount of the lifting or weight counterbalance force exerted by the accumulators can be increased by shifting the valves 100 and 102 upward by one position from the illustrated working position shown wherein the rod end is connected to the pump 96 and the piston end is connected to the sump 98. The lifting force exerted by the accumulators 86 and 88 can be decreased by shifting the valves 100 and 102 to their upper most positions wherein the rod ends of the actuators 72 and 74 are connected to the sump 98 and the piston ends are connected to the pump 96. When it is desired the actuators 72 and 74 be prevented from extending or retracting, the valves 100 and 102 are shifted to their lowermost positions wherein the flow of fluid to and from the cylinders 78 and 82 is prevented. The operation is essentially the same if the control circuit 104 is used instead of the circuit 84, but here only the accumulator 106 is used so no side-to-side compensation can be made for differences in weight of the implement at opposite sides of the longitudinal centerline of the implement. Furthermore, the control valve 110 omits the lockout function. In any event, when it is desired to once again raise the implement for transport, the cylinders of the actuators 58 and 60 are pressurized so as to effect a lifting action on the rocker arms 34 and 36 such that they act through the float actuators 72 and 74 to lift the links 12 and 14.

Thus, it will be appreciated that by simply modifying a conventional three-point hitch assembly 10 by substituting hydraulic actuators for the lift links and providing a control circuit embodying accumulators for causing these actuators to have a desired float characteristic, a three-point hitch assembly having individually floating draft links suitable for operating with a wide implement is created.

Having described the preferred embodiment, it will become apparent that various modifications can be made without departing from the scope of the invention as defined in the accompanying claims.

What is claimed is:

1. In a hitch assembly including a support frame, a pair of draft links mounted to said frame for pivoting vertically about a first horizontal transverse axis, a rocker shaft mounted to said frame for rotating vertically about a second horizontal transverse axis spaced vertically from said first horizontal transverse axis, a pair of rocker arms respectively joined to transversely spaced locations of said rocker shaft, a pair of drop links respectively having upper ends pivotally coupled to said pair of rocker arms and having lower end respectively coupled to said pair of draft links, and a power lift actuator arrangement coupled between said frame and said rocker shaft for selectively raising and lowering said draft links through selected rotation of said rocker shaft, the improvement comprising: said pair of drop links being respectively defined by a pair of extensible and retractable hydraulic flotation actuators; a control circuit coupled to said pair of hydraulic flotation actuators and including a pressure accumulator arrangement coupled to a rod end of each of said pair of flotation actuators for resisting extension of said flotation actuators, and hence, for counterbalancing the weight of any implement carried by said pair of draft links.

2. The hitch assembly, as defined in claim 1, wherein said control circuit includes a source of fluid pressure; a sump; and a control valve arrangement coupled to said source of fluid pressure, said sump and said accumulator arrangement and being operative for establishing a working condition wherein the accumulator arrangement is isolated from said sump and pump while piston ends of said pair of flotation actuators are coupled to said sump.

3. The hitch assembly, as defined in claim 2, wherein said control valve arrangement is further operative for respectively establishing charge and discharge conditions, wherein the pressure in said accumulator arrangement is respectively increased and decreased.

4. The hitch assembly, as defined in claim 2, wherein said control valve arrangement is further operative to establish a lockout condition, wherein fluid flow to and from said pair of flotation actuators is prevented.

5. The hitch assembly, as defined in claim 1, wherein said accumulator arrangement includes a single accumulator coupled to the rod ends of said pair of flotation actuators.

6. The hitch assembly, as defined in claim 1, wherein said accumulator arrangement includes a pair of accumulators respectively coupled to said pair of flotation actuators.

7. The hitch assembly, as defined in claim 2, wherein said accumulator arrangement includes a pair of accumulators respectively coupled to said pair of flotation actuators; and said control valve arrangement includes a pair of control valves which are each coupled to said pump and said sump; one of said pair of control valves being coupled to one of said pair of accumulators and to one of said pair of flotation actuators; and another of said pair of control valves being coupled to another of said pair of accumulators and to another of said pair of flotation actuators.

* * * * *